United States Patent
Fischer et al.

(10) Patent No.: US 9,196,248 B2
(45) Date of Patent: Nov. 24, 2015

(54) VOICE-INTERFACED IN-VEHICLE ASSISTANCE

(71) Applicant: Bayerische Motoren Werke Aktiengesellschaft, Munich (DE)

(72) Inventors: Hans-Peter Fischer, Simpsonville (DE); Ignacio Alvarez, Burgos (ES)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 224 days.

(21) Appl. No.: 13/766,487

(22) Filed: Feb. 13, 2013

(65) Prior Publication Data
US 2014/0229175 A1    Aug. 14, 2014

(51) Int. Cl.
| | | |
|---|---|---|
| *G10L 21/06* | (2013.01) | |
| *G10L 15/22* | (2006.01) | |
| *G10L 25/63* | (2013.01) | |
| *G10L 15/01* | (2013.01) | |
| *G01C 21/36* | (2006.01) | |

(52) U.S. Cl.
CPC ............ *G10L 15/22* (2013.01); *G01C 21/3608* (2013.01); *G01C 21/3629* (2013.01); *G10L 15/01* (2013.01); *G10L 25/63* (2013.01)

(58) Field of Classification Search
CPC .. G01C 21/3415; G01C 21/3453; A61B 5/16; A61B 5/4836; A61B 5/486
USPC .............. 704/235; 701/36; 715/810, 834, 841
See application file for complete search history.

(56) References Cited

U.S. PATENT DOCUMENTS

| | | | | |
|---|---|---|---|---|
| 7,096,431 | B2 * | 8/2006 | Tambata et al. ............... | 715/834 |
| 8,862,317 | B2 * | 10/2014 | Shin et al. ....................... | 701/36 |

OTHER PUBLICATIONS

Alvarez, I., et al. *The Voice User Help, a Smart Vehicle Assistant for the Elderly*. In Proceedings of Ubiquitous Computing and Ambient Intelligence, 6th International Conference, UCAmI 2012, Vitoria-Gasteiz, Spain, Dec. 3-5, 2012.
Alvarez, I., et al. *iHelp, the Ubiquitous Vehicle User Help*. In Proceedings of Interact 2011, 13th IFIP TC13 Conference on Human-Computer Interaction, Lisbon, Portugal Sep. 5-9, 2011.
Alvarez, I., et al. *Voice Interfaced User Help*. In Proceedings of Automotive UI '10 International Conference on Automotive User Interfaces and Interactive Vehicular Applications, Nov. 11-12, 2010. Pittsburgh, PA, USA.

* cited by examiner

*Primary Examiner* — Charlotte M Baker
(74) *Attorney, Agent, or Firm* — Crowell & Moring LLP

(57) ABSTRACT

Voice-interfaced, in-vehicle assistance includes receiving a voice-based query from a user in the vehicle, and then determining at least one of a user emotional state, user expertise level and speech recognition confidence level associated with the voice-based query. A text-based query may then be derived from the voice-based query, and used to search a help database for answers corresponding to the voice-based query. At least one response is then provided to the user in the form of voice-based assistance in accordance with at least one of the user emotional state, user expertise level and speech recognition confidence level.

26 Claims, 9 Drawing Sheets

VOICE-INTERFACED IN-VEHICLE ASSISTANCE

FIELD OF THE INVENTION

The present invention relates generally to providing voice-interfaced in-vehicle assistance, and more particularly to providing vehicle documentation and instructions using a conversational question-answering interface.

BACKGROUND OF THE INVENTION

The rapid advancement of vehicular technologies during the last years has resulted in an exponential increase of electronics in automobiles, bringing with them new vehicle control functions, cutting-edge sensors, rigorous fuel efficiency and optimized performance in breaking actions, lateral control or navigation and routing systems, among others. Along with the increased functionality, vehicles have become a place for information access, media consumption and personal entertainment. In-Vehicle Infotainment Systems offer wide ranging types of information. Additionally, drivers and passengers are bringing their personal consumer electronics into vehicle cockpits, turning cars into highly interactive spaces.

All these advances come however with a significant downside—vehicles are becoming incredibly complex machines. With the average population's age increasing worldwide, predictions point out that within 50 years one third of the population in regions like Japan, Europe, China and North America, will be over 60 years old. It is therefore safe to assume that a great number of drivers will be elders in the future. Many of current in-vehicle technologies are specially designed to be of aid to elder drivers. However, interactions with in-vehicle environments have become increasingly complex and drivers are susceptible to cognitive and perceptual information overload.

In driving conditions, mental resources are allocated for the primary driving task, leaving little capacity to secondary actions. Safety concerns have put In-Vehicle Infotainment Systems in the spotlight and some have estimated that the use of IVIS's contributed to 25% to 30% of crash risk. However, the use of infotainment and gadgets in the vehicle does not cease. The "multiple resource principle" states that multitasking of actions can take place if allocated in different perception modalities, which supported the design of hands-free, eyes-free vehicular interfaces. Different studies have addressed the effects of modality for dual-task performance in driving scenarios. Many present auditory interfaces are preferred media for in-vehicle warnings or navigation. Effects on driver distraction have been shown to be lower on voice interfaces.

Therefore, there is a need for an improved voice-interfaced system and method for providing in-vehicle assistance. In particular, there is a need for a smart voice-operated system that utilizes natural language understanding, as well as emotional adaptive interfaces, to assist drivers when problems occur on the road with minimal effect on their driving performance. There is also a need to provide a system and method which reduces the learning curve of new in-vehicle technologies and serves as a platform for the next generation of user-centered intelligent vehicle assistants.

SUMMARY OF THE INVENTION

Disclosed and claimed herein are systems, methods and computer program products for providing voice interaction in a vehicle. In one embodiment, the method includes receiving a voice-based query from a user in the vehicle, and then determining an emotional state for the user based on a detected valence and arousal level associated with the voice-based query. The method also includes deriving a text-based query from the voice-based query, and searching, using the text-based query, a help database for at least one response to the voice-based query. At least one response is then provided to the user in the form of voice-based assistance in accordance with the emotional state of the user.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview

Figure 1:
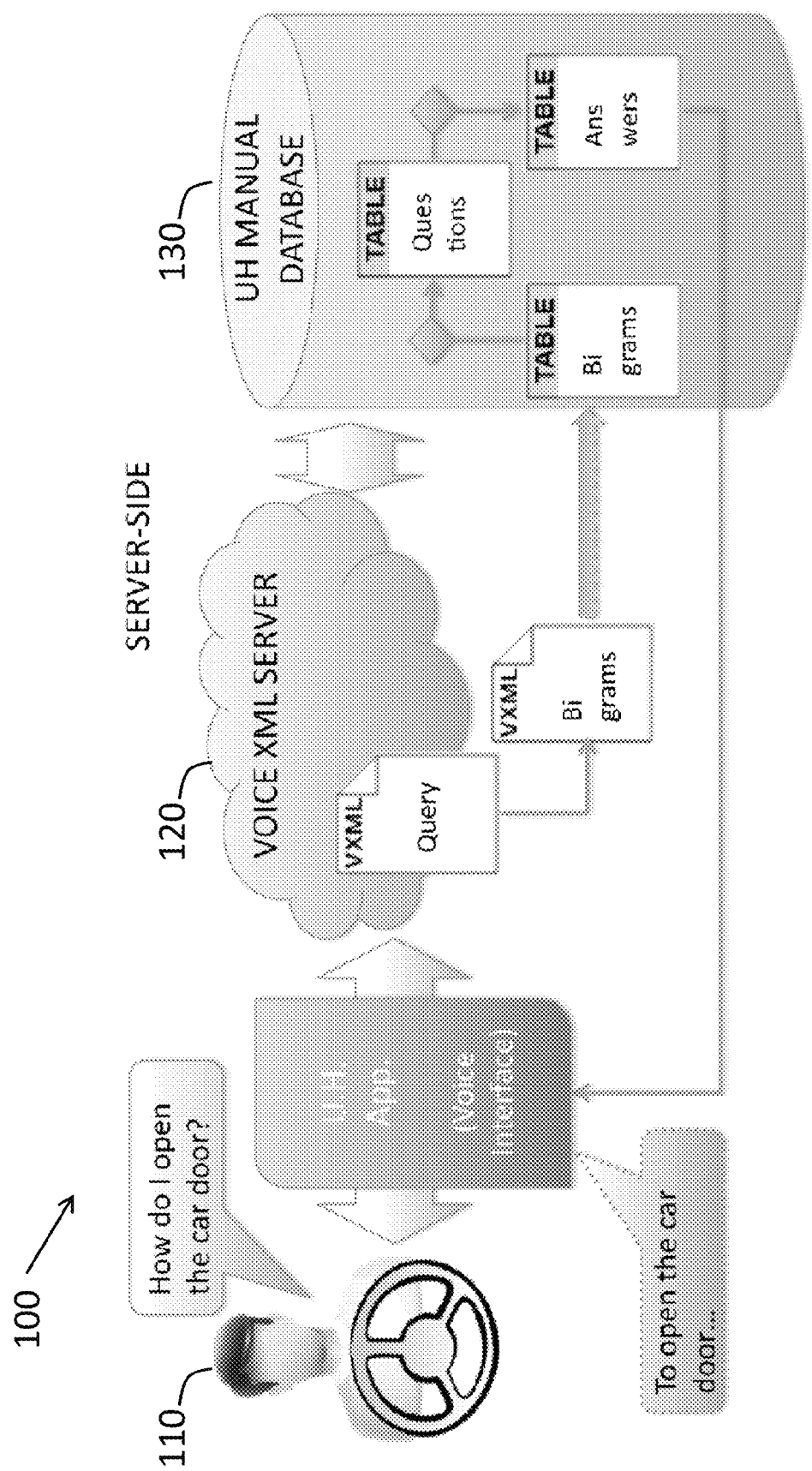
FIG. 1 is a block diagram illustrating an exemplary voice-interfaced in-vehicle assistance system configured in accordance with the principles of the invention.

One aspect of the present disclosure relates to a hands-free, eyes-free driver assistance interface that provides vehicle documentation and instructions using a conversational question-answering interface. The interface is specifically configured to improve current vehicle documentation through a driver-centered design.

Another aspect is to improve the driver assistance by providing easy and intuitive access to information under potentially stressful conditions. In certain embodiments, this is accomplished by presenting a voice interface with minimum cognitive load in the vehicle side.

A user help database or knowledge repository which comprehends target information (e.g., vehicle manual information) may be accessible through an information retrieval module of the user assistance system. In order to access the user assistance systems, the user first activates the system, e.g., pushing a call/activation button on the steering wheel. After the user assistance system starts, any speech input from the user will be provided to an automatic speech recognition module that translates the audio query into text. In certain embodiments, an information retrieval module may then use the text to perform a search in the user help database. The result of the search may be presented in the form of spoken answers and confirmation feedbacks.

In parallel to the speech recognition module, another aspect of the invention is to use an emotion recognition engine which estimates the current emotional state of the user. This information may then be used to improve the accuracy of the voice interface's responses, thereby reducing the cognitive load on the driver that may be generated by a possible long and frustrating interaction with the driver assistance system.

In addition to the emotion recognition engine, another aspect of the invention is to determine expertise level for the user based on a number of correct answers and a number of incorrect answers that have been provided by the voice interface server. The voice interaction may then be further adapted to take into account both the expertise level and the emotional state of the user. Similarly, a speech recognition confidence level associated with the voice-based query may additionally be used to adapt the voice interaction in a way which improves the overall user experience and the accuracy of the responses provided to the user.

In certain embodiments, it may also be helpful to generate bigrams corresponding to the voice-based query, which may then be individually weighted based on at least one of their frequency of occurrence in the help database and their relative position within the text-based query. In this fashion, the help database may then be searched in accordance with the weighted bigrams which correspond to a voice-based query.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

The term "server" means a functionally-related group of electrical components, such as a computer system in a networked environment which may include both hardware and software components, or alternatively only the software components that, when executed, carry out certain functions. The "server" may be further integrated with a database management system and one or more associated databases.

Voice Interface Architecture

Referring now to FIG. 1, depicted is one embodiment of a system 100 in which the invention may be implemented. In particular, system 100 comprises a driver 110 using a voice interface application, of the user assistance system, to receive instructions on how to open the vehicle's door. In this embodiment, VoiceXML is used to provide a front-end voice user interface, where VoiceXML is a version of XML designed for creating voice activated dialogs.

The voice interface server 120 may comprise one or more software modules which function as a VXML dialog manager to provide various speech recognition services and speech-to-text functionality. As will be explained in more detail below with respect to FIG. 4, when the user 110 calls the voice interface server 120, it prompts the users to ask a question. The query is executed against a user help database, shown as database 130, which may be configured to return a predetermined number of mostly likely results. The question with the highest concentration, or frequency, of matched terms (bigrams) may be returned first. The question with the second highest concentration of matched terms may be returned second, and so on. If none of the answers returned provide the user 110 with a correct answer, then the user 110 may again be prompted to rephrase the question.

Figure 2:
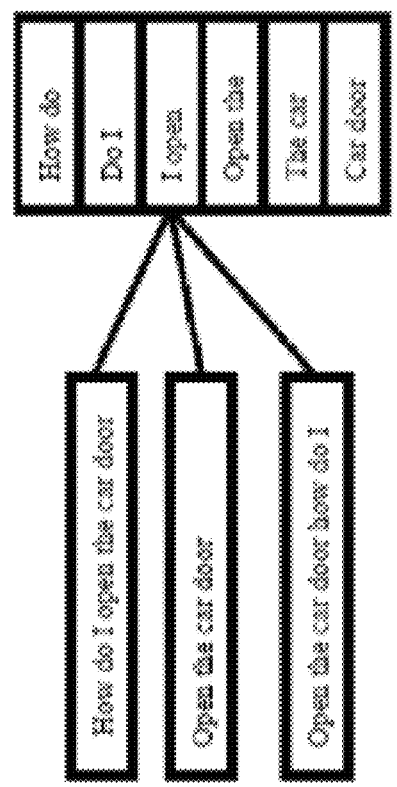
FIG. 2 illustrates a simplified diagram of how bigrams may be produced from voice inputs.

Since the universe of possible questions and manner of phrasing them is very high, another aspect of the invention is avoid the use of static grammar, and instead to dynamically create the grammar from bigrams stored in a 'terms' database or knowledge repository (e.g., in database 130). In certain embodiment, this may enable the user 110 to ask the same question in several ways but always get the same result. By generating questions dynamically using bigrams, a grammar that recognizes a large number of utterances with minimal effort, can be provided. By way of example, the questions "How do I open the car door", "Open the car door", and "Open the car door how do I," may be each mapped to the same set of bigrams, as shown in FIG. 2.

Database 130 may be an SQL database composed of several tables: bigrams/terms, questions, answers and answer ID. The "answers table" contains the path to the answer files, where each answer is linked to an "Answer Identifier" that contains the topic of the answer and may be played back to the user as a feedback to confirm the choice. The "questions table" contains all the questions that can be asked for each answer. Each question is linked to the Answer ID and therefore connected to the answer. Each question has an identifier that allows the bigrams of which it is composed to be pointed to its original question.

The "Bigrams table" contains the grammar corpus formed by pairs of words, or bigrams, obtained from the questions. Each bigram is tied to a question. Repeated bigrams can point to different questions, in particular at the beginning of the question, e.g. "How-do" or "How-can". Using the bigrams table, an algorithm may be used to create a grammar that includes all possible questions formed from all combinations of bigrams in the database. Because the grammar is dynamically generated, a larger variety of anticipated questions may be made available to the user. As a result, the system is more likely to recognize the user's question.

Figure 3:
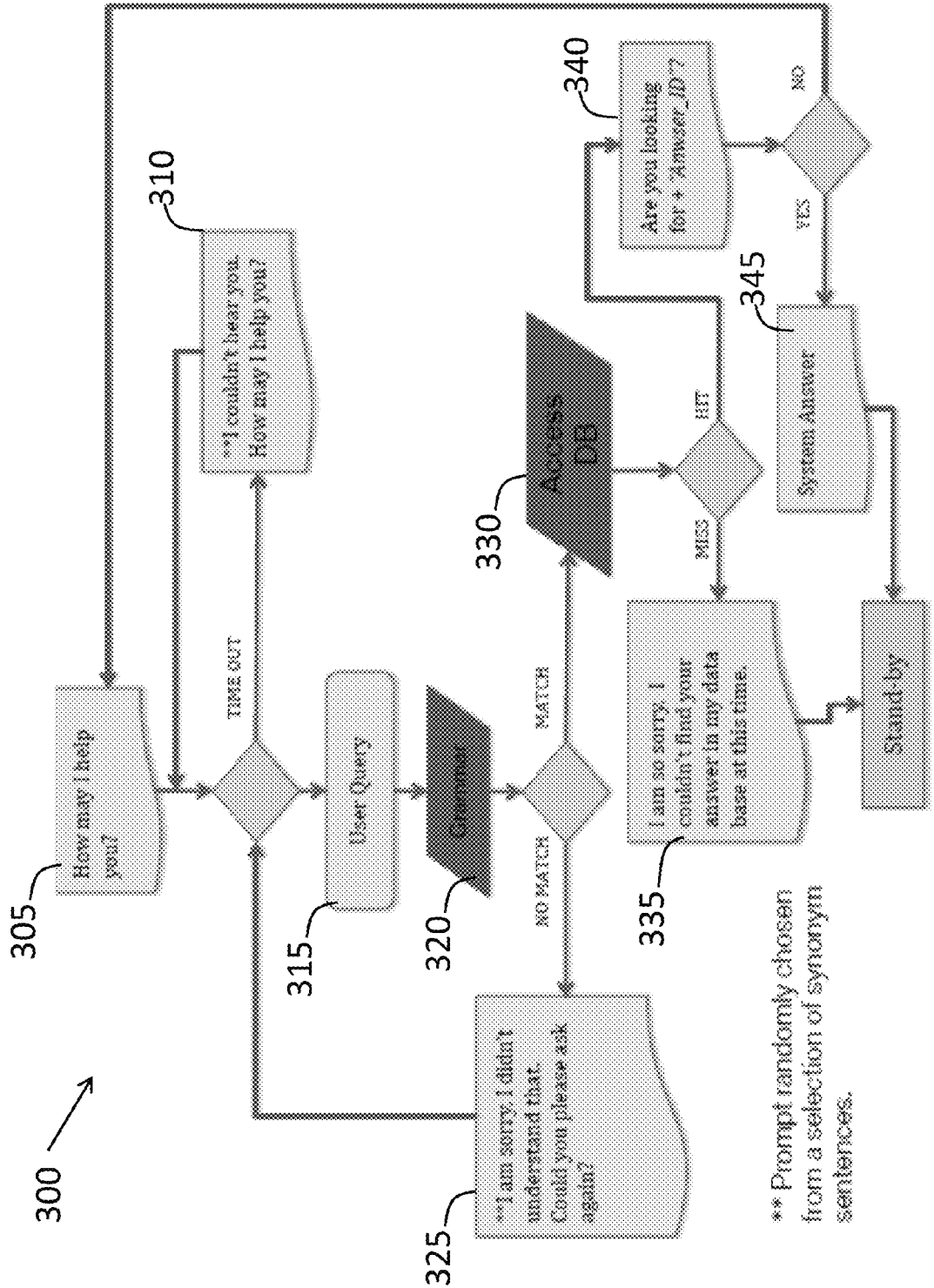
FIG. 3 depicts a process for how a user may interact with the voice-interfaced in-vehicle assistance system of FIG. 1.

Referring now to FIG. 3, depicted is one embodiment of a voice interaction process 300 that may be used in conjunction with the invention. After the user activates the system, such as by pressing a call button, process 300 may prompt the user to provide a query (block 305). If no query is received or otherwise detected within a predetermined time, an additional prompt may be provided to the user (block 310). If, on the other hand, a user query is detected, the process may advance to block 315 where the user query may be converted into text. This text may then be provided to a grammar sub-process 320 which operates on the text so as to generate corresponding grammar to be used as the search parameter. In certain embodiments, this operation may comprise dynamically creating the grammar from bigrams, as described above. If process was unable to match the query to any corresponding grammar, the user may be prompted to repeat the query (block 325). Otherwise, the generated grammar may be provided as a search string to a knowledge repository at block 330.

Continuing to refer to FIG. 3, once the user help database/knowledge repository receives the grammar, the process will attempt to find a match. If there is no match, process 300 may communicate this result to the user (block 335) and then enter a stand-by mode. If, on the other hand, a match is found, process 300 may then orally present the result to the user and ask for confirmation that the returned information was in fact the requested information (block 340).

Figure 4A:
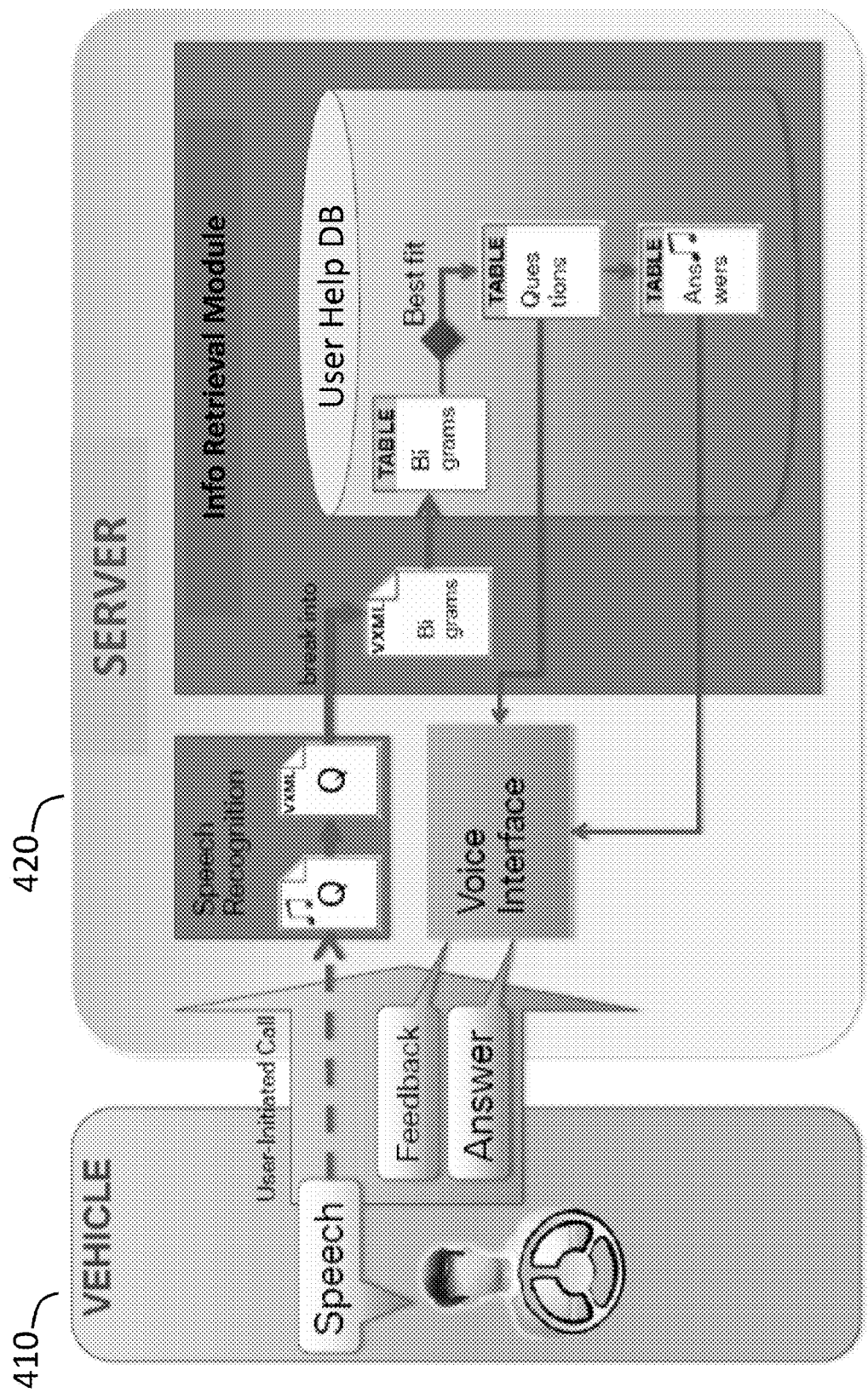
FIGS. 4A-4D depict various levels of how the voice-interfaced in-vehicle assistance system of FIG. 1 may be integrated into a vehicle.

The process 300 of FIG. 3 may be implemented in varying architectures, based on the degree to which the voice application is integrated into the vehicle itself. For example, FIGS. 4A-4D depict varying degrees to which the user assistance system of the present invention may be integrated into the vehicle itself. In particular, FIG. 4A depicts a fully remote configuration in which the various components of the voice application are remotely located at server 420, including the speech recognition module, voice interface module, information retrieval module and user help database.

Figure 4B:
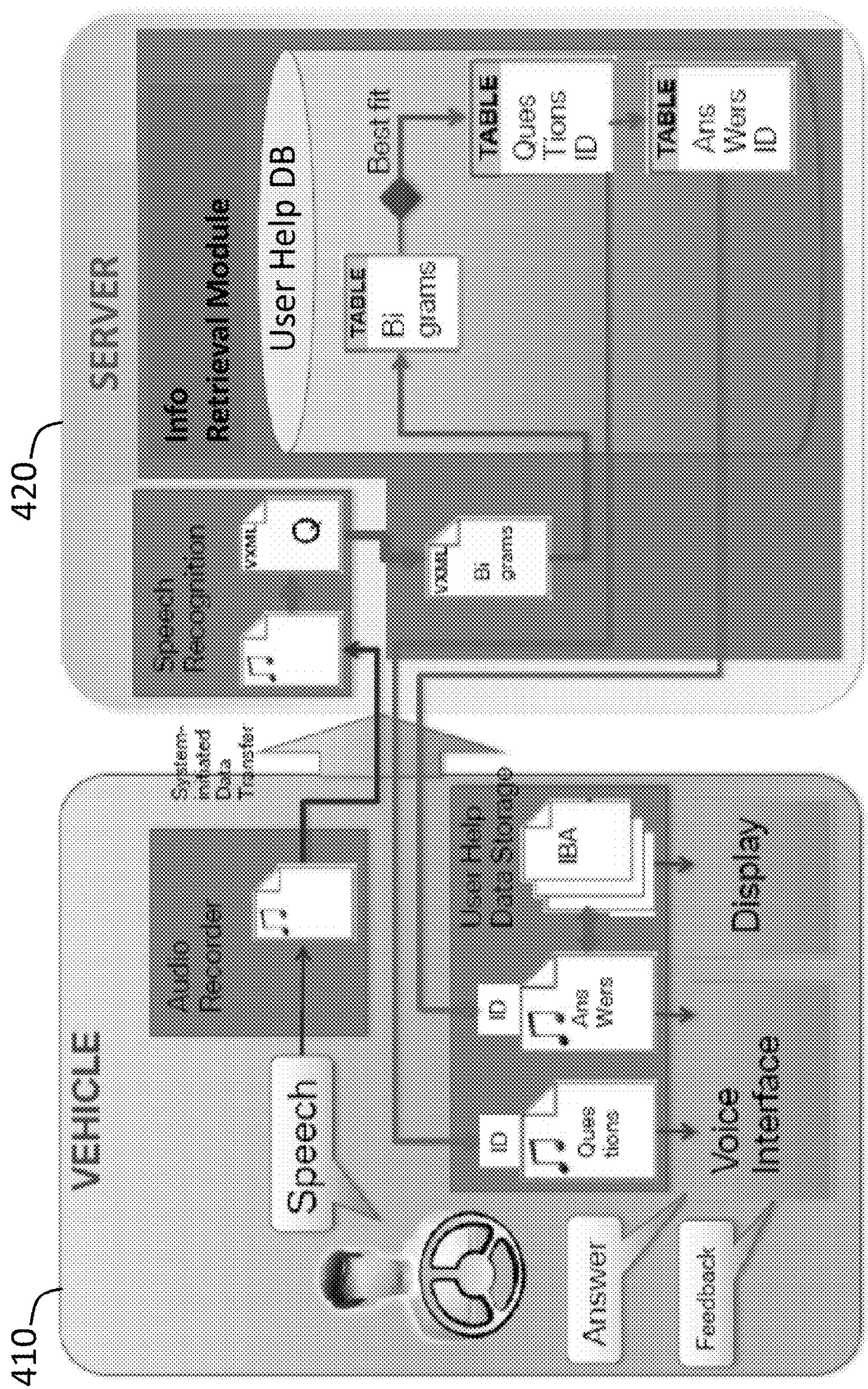
Figure 4C:
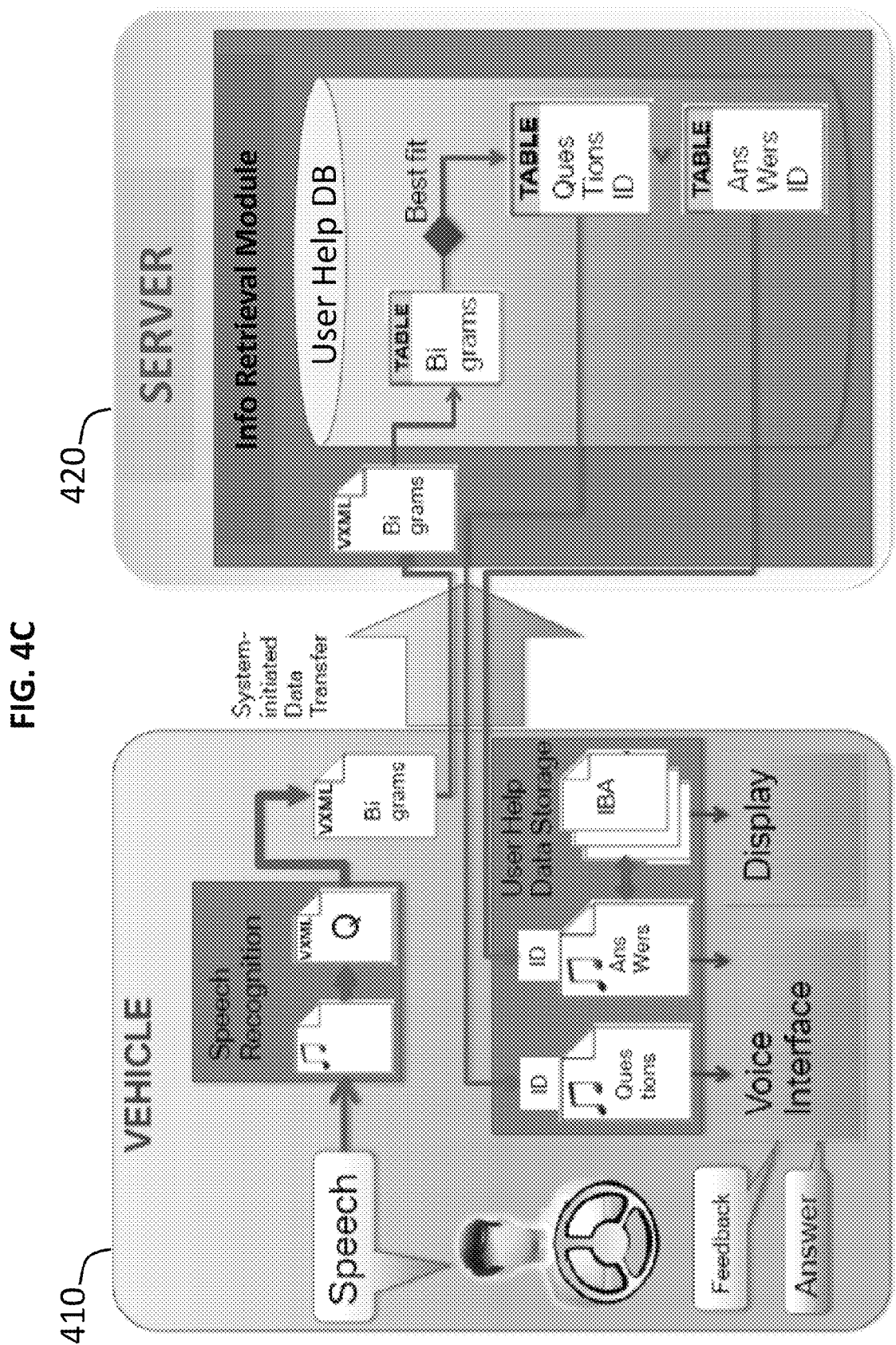
Figure 4D:
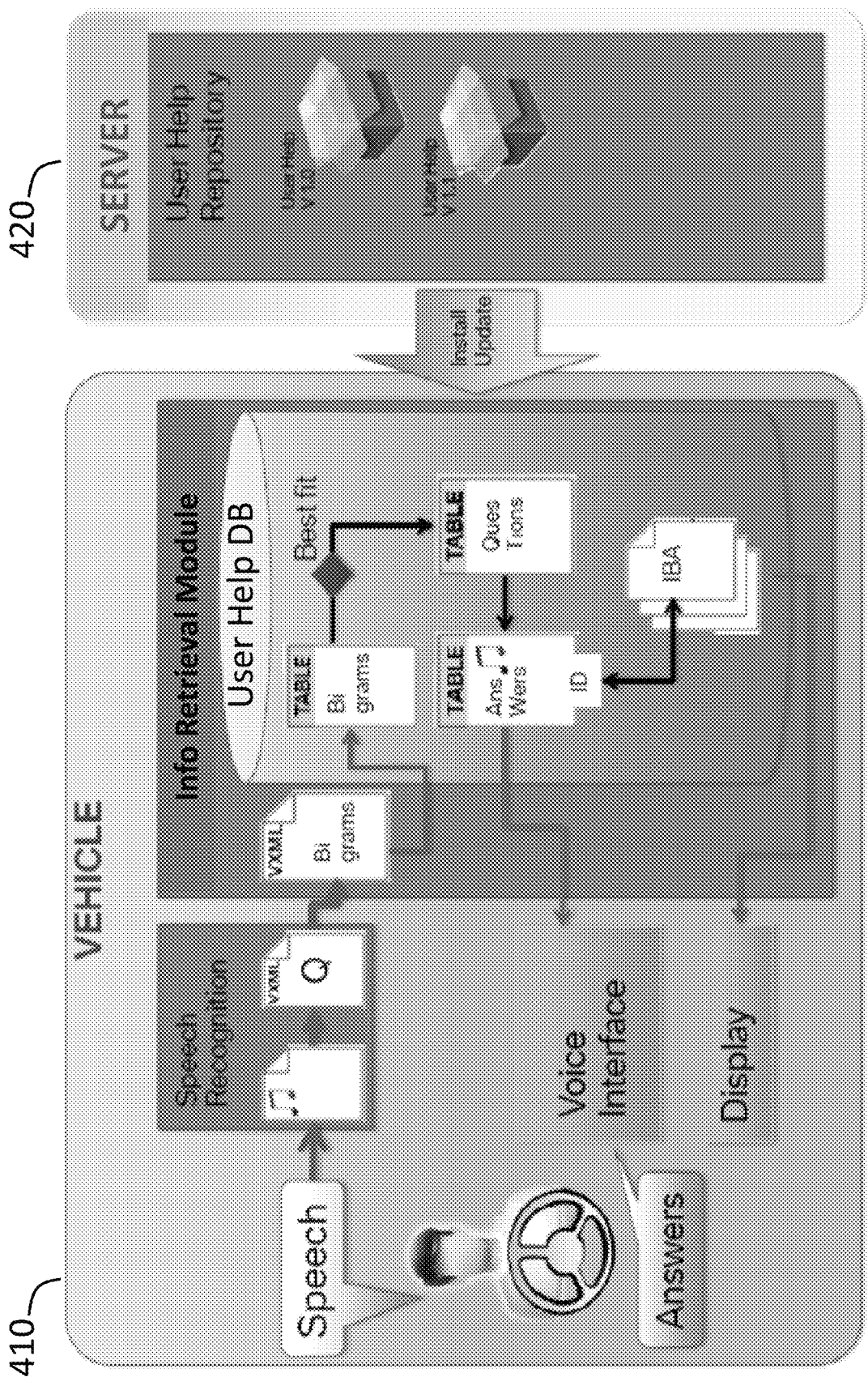

In FIG. 4B, on the other hand, certain components are moved from the server 420 to the vehicle 410, including the audio recording module, voice interface and local storage of answers returned by server 420. FIG. 4C depicts an even more integrated architecture in which additional components are moved from server 420 to the vehicle 410, including the speech recognition module. Finally, FIG. 4D depicts a fully integrated architecture in which even the information retrieval module and user help database is integrated into the vehicle 410. In this embodiment, only updates are provided by server 420. Therefore, it should be appreciated that the invention may be implemented in a wide variety of system and network architectures.

While the above described system is effective in carrying out voice-interfaced, in-vehicle assistance, the invention recognizes that accuracy and performance can be improved by further augmenting the voice interface application with certain adaptive qualities, as described below.

Adaptive Voice Interaction

It is a further aspect of the invention to further supplement the voice interaction process (e.g., process 300 of FIG. 3) so as to further tailor or adapt the answers/dialog that are provided to the user. In particular, the information retrieval process may be modified to further consider the driver's emotional state, experience level and/or a speech recognition confidence level associated with the driver's query. This additional data may then be used to modify or supplement the voice interaction that occurs between the user and the user assistance system, as described above, so as to improve the accuracy of the returned answer as well as to improve the overall user experience and reduce driver distraction.

Figure 5:
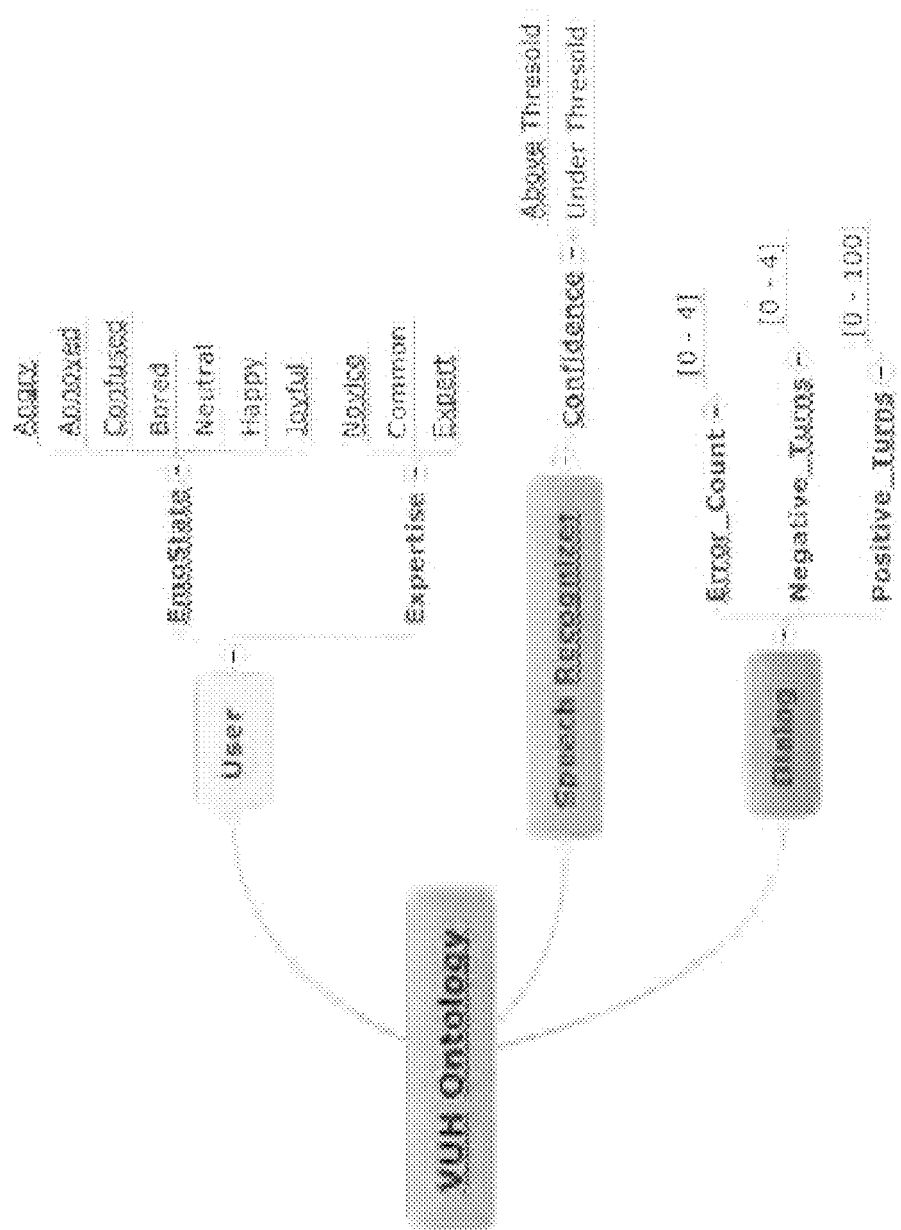
FIG. 5 is a simplified diagram of an ontology for one or more aspects of the voice-interfaced in-vehicle assistance system in accordance with the principles of the invention.

In order to augment the user assistance system with adaptive characteristics, a definition of entities that affect the voice interface dialog, and their relationships to each other, is shown in FIG. 5. In particular, an ontology for the voice interaction application is defined by a series of object classes—a user class, speech recognition class and a dialog class. For the user class, two variables may be defined—the emotional state (EmoState) and experience Level (Expertise). The speech recognizer class contains only a confidence level variable reflective of how confident the dialog manager is in the result returned from the speech recognizer. Finally, the dialog class contains several variables that are reflective of the user's ability to effectively interact with the voice interface application. The emotional state is capture automatically during the user interaction by the emotion recognizer which analyses the user input on a prosodic level and classifies them into one of the defined driver emotional state.

With respect to emotional state, the invention recognizes that users might be predisposed to emotional distress when consulting the voice interface since they are trying to find information often time to solve a problem involving the vehicle. To mitigate the effects of these situations, the invention further comprises an emotion recognition engine that analyses voice utterances to detect the current emotional state based on prosodic cues. The purpose of the emotional taxonomy for the voice interface is to identify the user's mental state while interacting with the application. Thus, only emotions that provided information for an adaptive interface that optimized the interaction for driver distractions need be included in the taxonomy. This concept is discussed in detail below with reference to FIG. 6.

It may also improve the accuracy of the emotion recognizer to provide the user with the ability to personally train the emotion recognizer, such as during the set up phase asking the user to act the different emotions, and/or through the repeated usage of the application.

When the user presents his query, one or more components of the user assistance system may perform various operations relating to the voice data that is received and how it is processed. Once a user query has been converted or translated, the one or more components of the system (e.g., voice interface, dialog manager module, etc.) may then send the translated string to an information retrieval module, which performs a search of the user help database in order to retrieve one or more answers that are linked or matched to the provided query, as described above with references to FIGS. 1-4.

At the same time, however, the user assistance system may provide the audio data from the user's query to an emotion recognition engine in order to perform a real-time analysis of the prosodic values of the utterance and classify it into one of the known emotional states.

The variable EmoState of FIG. 5 is obtained from the emotion recognition engine. However, given the variety and discordance of emotional taxonomies in the literature, there is a need to define an emotion classification adapted to a driving environment and the kind of interaction that the voice interface provides. In particular, a group of primary emotions for the taxonomy whose attributes are clearly distinguishable may be defined. Moreover, given that the voice interface receives only one input modality, only emotions that can be recognized by auditory parameters may be considered in the classification. By way of a non-limiting examples, the emotional taxonomy may include angry, annoyed, confused, bored, neutral, happy and/or joyful.

The purpose of the emotional taxonomy may be to identify the user's mental state while interacting with the application. Thus, emotions like fear or sadness may be omitted from the taxonomy because they would most likely not be a consequence of the interaction with the voice interface. Furthermore, only emotions that provided information for an adaptive interface that optimized the interaction may be included in the taxonomy, e.g., if the user is found to be in a sad emotional state, the user interface would do a poor job in trying to comfort her/him. On the other hand, if the user was found to be annoyed due to poor performance of the application, the user interface could be modified to provide further information on the reasons of these problems and therefore neutralize the negative emotional state.

Figure 6:
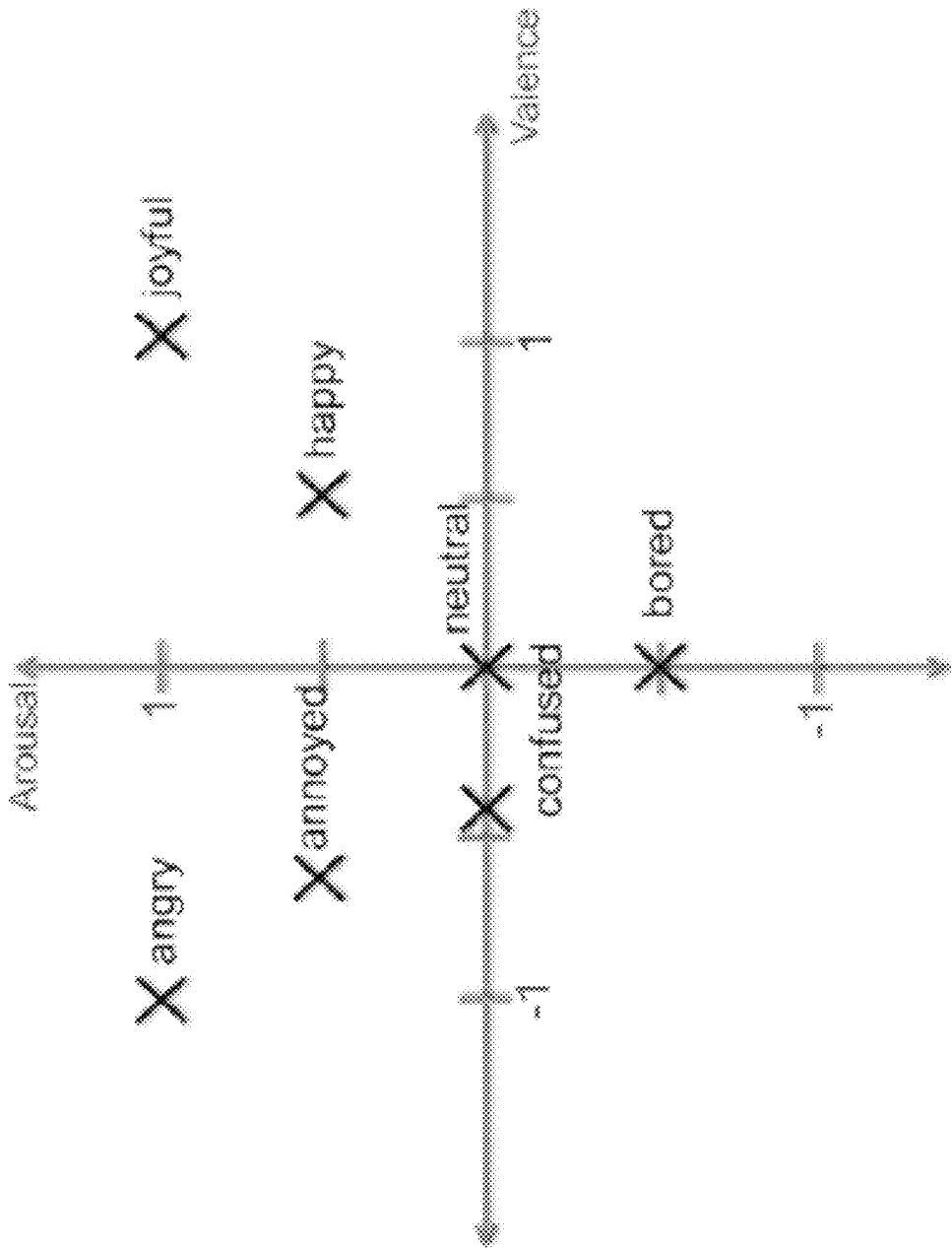
FIG. 6 is a diagram of the emotional taxonomy plotted as a function of valence and intensity/arousal level.

With reference now to the diagram of FIG. 6, the emotional taxonomy may provide a varied range of states in both valence and intensity. Due to the subjectivity of different emotion theories and the uncertainty of the emotion recognizer, crosses indicate regions where the emotions are located, rather than exact positions. This two dimensional vector can be used as dialogue control parameters to adapt the dialogue flow to the emotional states detected Limiting the range of values to (−1,1) for both valence and arousal, an Emotion Position Vector may be defined for the neutral state in the vector (0,0). Happy and joyful may have positive values for both axes, while angry and annoyed will tend to show positive arousal but negative valence. Finally, bored may show neutral valence but negative arousal.

Once determined, the resulting two dimensional vector can be used as a dialogue control parameter to adapt the dialogue flow to the different emotional states detected in the user's voice input. For example if the user was presented a wrong answer to his query and the emotion recognizer detected that that last question was made in an "annoyed" emotional state, the user will apologize accordingly and provide information about the root cause of the mismatch, for example a low confidence in the speech recognition engine due to extreme background noise. Thus the system will ask the user to repeat the question. Other example might consider the case that a wrong answer was provided to the user, but in this case he is a "happy" state. The system might convey that no information on such a query is available in the knowledge database and inform the user if a request for such a question would be desirable. The language selection and prosodic tone of the application would match the positive emotional state of the user.

Referring once again to FIG. 5, the 'Expertise' variable of the user class may assume difference values, and in this exemplary case may include novice, common and expert, from the lowest familiarity with the system to the highest. While the default option of the class may be set to novice, the value can be changed based on the number of positive and negative turns in the dialog as well as the detection of a confused emotional state by the emotion recognition module. Once the number of successful interactions grow, the value may change from novice to common or even to expert. If a number of wrong turns or excessive errors occur during the life-cycle, the Expertise state may revert to novice and additional voice-based assistance may be offered to inform or remind the user of the best way to achieve higher performance.

With respect to the speech recognition class, a confidence score associated with the sentence retrieved by the speech recognition system may also be used to adapt the voice interface. Depending on the Speech To Text engine used, further variables could be added here, such as confidence per word or word error rate.

With respect to the dialog class, a number of counters may be used to actualize the variables presented in the ontology. The Error_Count variable may be used to keep track of the number or connection errors and barge-in turns to account for possible growing of the user's frustration. If during the life-cycle of the application, the value reaches a predetermined number, the application may suggest that the user terminate the interaction and try again after a few minutes to prevent heightened levels of driver distraction due to longer and increasingly frustrating interactions.

The Negative_Turns variable may be used to inform the dialog manager of the number of wrong answers presented to the user in the application life-cycle. Different dialog strategies might take place depending on the increasing value of this variable to adapt to possible negative predisposition of the user due to unsuccessful searches.

Finally, the Positive_Turns variable may be used to keep track of the number of successfully retrieved answers in order to upgrade the user expertise level. The more successful interactions gained, the application will need less instructional usage resources and can focus on providing the best performance for an experienced user.

The above-described ontology allows the system to adapt its dialog interactions to the current dialog states taking into consideration previous interactions, as well as the emotional state. It should further be appreciated that the user assistance system need not be a unitary component or module, but may be a collection of rules and conditions distributed among different components and/or software modules.

Thus, in this fashion, a more adaptive user assistance system and method is achieved since additional, particular adaptive characteristics relating to emotional state, user expertise and/or query confidence may be considered in providing voice-based, in-vehicle user assistance.

Weighted Information Retrieval Algorithm

While the information retrieval module may utilize various known searching algorithms, in certain embodiments the information retrieval module may be based on the Answers First methodology developed by Dale-Marie Watson, as documented in "iTECH: an interactive technical assistant" (Wilson, 1996).

Another novel aspect of the invention is to modify the search algorithm (e.g., Answers First) so as to evaluate the uniqueness level of the bigram in the corpus. The basic idea is that bigrams with lower number of repetitions in the database, would be more illustrative of the aim of the questions than are bigrams that are often repeated. For example a bigram like "How do" would appear in hundreds of questions, while "cruise-control" would only appear on those questions related to the operation of the cruise-control feature. This allows establishing weights on key terms without the need to semantically parse the bigrams. The resulting query would be ranked according to the following formula:

$$W_q = \sum_{i=1}^{n} \frac{1}{NumOfOccurence_i}$$

where $W_q$ is the weight for the query, n is the number of bigrams in the query and $NumOfOccurence_i$ is the relative weight of each bigram.

A second novel modification to the Answers First algorithm is to weight bigrams according to their relative position in the question. This idea benefits from the grammatical structure of words in English language. Most of the times, questions begin with some interrogative pronoun such as "who, what, where, why or how" followed by an auxiliary verb such as "can I" or "do you" and end with the core of the question. Some examples are "how can I open the door?", "where is the cruise control?", "what do I have to do to change radio channels?".

Even in cases when the interrogative pronouns are not used in first place, this rule generally still applies, e.g. "can you tell me the way to fold in the exterior mirrors?". The database was thus modified to save the position of each bigram in the sentence and allows providing a relative weight in the sentence according to its position.

The resulting query would be ranked according to the following formula:

$$W_q = \sum_{i=1}^{n} \frac{OrderInQ_i}{Qlength}$$

where $W_q$ is the weight for the query, n is the number of bigrams in the query and $OrderInQ_i$ is the position within the sentence and Qlength is the length of the sentence.

In addition, the above two modifications may be combined such each bigram was rated by the relative position in the sentence and the uniqueness in the bigram corpus. In this case, a query would be ranked according to the following formula:

$$W_q = \sum_{i=1}^{n} \frac{OrderInQ_i}{NumOfOccurence_i}$$

Finally, another proposed modification would be to combine and extend the previous ones by including the relative length of the query in the weight of the bigram. This would be the resulting formula $$W_q = \sum_{i=1}^{n} \left( \frac{OrderInQ_i}{NumOfOccurence_i * Qlength} \right)$$

Thus, in this fashion, a more adaptive user assistance system and method is achieved since additional, particular characteristics of the user-provided query may be considered when searching the user help database. Furthermore, different weighting strategies might be chosen depending on the language in which the original query was presented on specific language styles adopted by the user.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for providing voice interaction in a vehicle, the method comprising the acts of:
   receiving, by a voice interface server, a voice-based query from a user in the vehicle;
   determining, by the voice interface server, an emotional state for the user based on a detected valence and arousal level associated with the voice-based query;
   deriving, by the voice interface server, a text-based query from the voice-based query;
   searching, by the voice interface server using the text-based query, a help database for at least one response to the voice-based query; and
   providing, by a voice interface server, the at least one response to the user in the form of voice-based assistance in accordance with the emotional state of the user.

2. The method of claim 1, further comprising:
   receiving, by the voice interface server prior to said voice-based query being provided, a request from the user to receive voice-based assistance; and
   prompting, by the voice interface server, the user to provide the voice-based query.

3. The method of claim 1, wherein the determined emotion state is selected from a predetermined emotional taxonomy.

4. The method of claim 1, further comprising adapting the form of the voice-based assistance provided to the user in accordance with the emotional state.

5. The method of claim 1, further comprising determining, by the voice interface server, an expertise level for the user based on a number of correct answers and a number of incorrect answers that have been provided by the voice interface server.

6. The method of claim 5, wherein providing the at least one response to the user comprises providing, by a voice interface server, the at least one response to the user in the form of voice-based assistance in accordance with both the expertise level and the emotional state of the user.

7. The method of claim 1, further comprising determining, by the voice interface server, a speech recognition confidence level associated with the voice-based query.

8. The method of claim 7, wherein providing the at least one response to the user comprises providing, by a voice interface server, the at least one response to the user in the form of voice-based assistance in accordance with both the speech recognition confidence level and the emotional state of the user.

9. The method of claim 1, wherein deriving the text-based query comprises:
   performing, by the voice interface server, a speech recognition operation; and
   generating, by the voice interface server using a result of the speech recognition operation, a plurality of bigrams corresponding to the voice-based query, wherein the bigrams comprise the text-based query.

10. The method of claim 9, further comprising weighting, by the voice interface server, each of the plurality of bigrams based on at least one of their frequency of occurrence in the help database and relative position within the text-based query.

11. The method of claim 10, wherein searching the help database comprises searching, by the voice interface server using the text-based query and accordance with said weighting, the help database for at least one response to the voice-based query.

12. The method of claim 1, wherein the voice interface server comprises a plurality of software modules, including a voice interface module, a speech recognition module, an information retrieval module and a user help database.

13. The method of claim 12, wherein at least one of the plurality of software modules is executed by one or more processors in the vehicle.

14. The method of claim 13, wherein at least one of the plurality of software modules is executed by a remote server with which the vehicle communicates over a wireless network connection.

15. A computer program product, comprising:
a non-transitory processor readable medium having processor executable code embodied therein to provide voice interaction in a vehicle, the processor readable medium having:
processor executable program code to receive a voice-based query from a user in the vehicle,
processor executable program code to determine an emotional state for the user based on a detected valence and arousal level associated with the voice-based query,
processor executable program code to derive a text-based query from the voice-based query,
processor executable program code to search, using the text-based query, a help database for at least one response to the voice-based query, and
processor executable program code to provide the at least one response to the user in the form of voice-based assistance in accordance with the emotional state of the user.

16. The computer program product of claim 15, wherein the processor readable medium further comprises processor executable program code to:
receive, prior to said voice-based query being provided, a request from the user to receive voice-based assistance, and
prompt the user to provide the voice-based query.

17. The computer program product of claim 15, wherein the determined emotion state is selected from a predetermined emotional taxonomy.

18. The computer program product of claim 15, wherein the processor readable medium further comprises processor executable program code to adapt the form of the voice-based assistance provided to the user in accordance with the emotional state.

19. The computer program product of claim 15, wherein the processor readable medium further comprises processor executable program code to determine an expertise level for the user based on a number of correct answers and a number of incorrect answers that have been provided by the voice interface server.

20. The computer program product of claim 19, wherein the processor executable program code to provide the at least one response to the user comprises processor executable program code to provide the at least one response to the user in the form of voice-based assistance in accordance with both the expertise level and the emotional state of the user.

21. The computer program product of claim 15, wherein the processor readable medium further comprises processor executable program code to determine a speech recognition confidence level associated with the voice-based query.

22. The computer program product of claim 21, wherein the processor executable program code to provide the at least one response to the user comprises processor executable program code to provide the at least one response to the user in the form of voice-based assistance in accordance with both the speech recognition confidence level and the emotional state of the user.

23. The computer program product of claim 15, wherein the processor executable program code to derive the text-based query comprises processor executable program code to:
perform a speech recognition operation, and
generate, using a result of the speech recognition operation, a plurality of bigrams corresponding to the voice-based query, wherein the bigrams comprise the text-based query.

24. The computer program product of claim 23, wherein the processor readable medium further comprises processor executable program code to weight each of the plurality of bigrams based on at least one of their frequency of occurrence in the help database and relative position within the text-based query.

25. The computer program product of claim 15, wherein at least some of the processor executable program code is executed by one or more processors in the vehicle.

26. The computer program product of claim 15, wherein at least some of the processor executable program code is executed by a remote server with which the vehicle communicates over a wireless network connection.

* * * * *